United States Patent [19]  
Hartman et al.

[11] 3,947,255  
[45] Mar. 30, 1976

[54] METHOD OF EXTRUDING BARK AND OF FORMING A SOLID SYNTHETIC FUEL

[75] Inventors: William H. Hartman, Rolling Meadows; Raymond E. Mietz, Barrington; John R. Peschke, Prospect Heights; Donald H. Ruge, Crystal Lake, all of Ill.

[73] Assignee: American Can Company, Greenwich, Conn.

[22] Filed: Jan. 10, 1973

[21] Appl. No.: 322,460

[52] U.S. Cl. ..................... 44/10 H; 44/10 E; 44/25
[51] Int. Cl. ............................ C10l 5/00; C10l 5/14
[58] Field of Search ............. 44/10 R, 24, 25, 10 A, 44/10 B, 10 E, 10 H

[56] References Cited
UNITED STATES PATENTS

| | | | |
|---|---|---|---|
| 1,870,522 | 8/1932 | Maurel | 44/24 |
| 3,036,900 | 5/1962 | Honeycutt | 44/25 |
| 3,232,721 | 2/1966 | Coyner | 44/10 R |
| 3,726,651 | 4/1973 | Ronden | 44/24 X |

FOREIGN PATENTS OR APPLICATIONS

| 901,789 | 7/1962 | United Kingdom | 44/25 |
|---|---|---|---|

*Primary Examiner*—Carl F. Dees  
*Attorney, Agent, or Firm*—Robert P. Auber; Paul R. Audet; George P. Ziehmer

[57] ABSTRACT

A method of extruding bark and of forming a solid article, solid synthetic fuel or fireplace log comprising from about 60 to 95 percent by weight bark, which comprises physically blending pieces of combustible thermoplastic of an extrudable size with pieces of bark also of an extrudable size and having less than 7 percent preferably less than 2 percent moisture, to form a bark thermoplastic mixture of from about 60 to 95 percent by weight bark and about 2.5 to 40 percent by weight thermoplastic, feeding the mixture to an extruder, heating the bark thermoplastic mixture in the extruder, controlling the heat of the extruder so that its temperature is insufficient to char the bark pieces yet sufficient to melt the thermoplastic and disperse it between the bark pieces so that it acts as a binder therefor and adheres sufficiently to the interior barrel wall surface of the extruder to allow the mixture to be moved therethrough by the extruder screw, extruding the mixture in the form of a composite extrudate, and cooling the composite extrudate to solidify it into the solid synthetic fuel. Preferably, the extruder screw tip is cooled and the heat of the extruder is controlled to range from about 200° to 400° F. with certain temperatures maintained in the respective extruder barrel zones.

40 Claims, 1 Drawing Figure

U.S. Patent   March 30, 1976   3,947,255
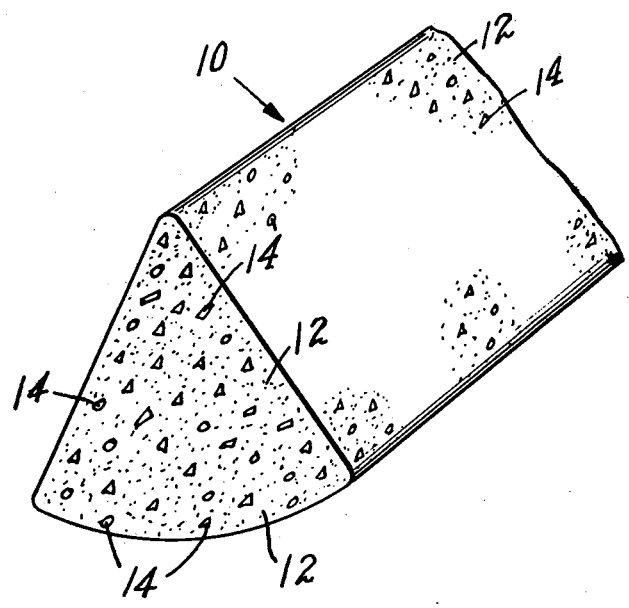

METHOD OF EXTRUDING BARK AND OF FORMING A SOLID SYNTHETIC FUEL

BACKGROUND OF THE INVENTION

This invention relates to bark articles, and has particular reference to a method of extruding articles, such as solid synthetic fuels and fireplace logs comprising mostly bark.

Heretofore, extrusion techniques have not been successful as methods of forming bark articles. Bark has heretofore been extremely difficult to extrude for several reasons. It has a high moisture content, usually about 50% and must be dried to prevent extruder heat, and compressional and frictional heat from changing the moisture to steam and causing explosions within the extruder. Also, dried bark does not readily flow through an extruder. Dried bark is hard and does not sufficiently adhere to the interior surface of extruder barrel wall to allow the extruder screw to pass the bark on through the extruder. Rather, bark tends to turn with and remain with the screw in the extruder. Further, bark often chars or burns due to heat during the extrusion process. Still further, bark is not easily extrudable through a die into the form of a solid article since natural resins in bark are not adequate to bind pieces of bark together at an economical rate of speed.

It would therefore be desirable to provide a method of extruding bark into the form of formed articles comprising mostly bark, which overcomes the aforementioned extrusion and forming problems.

Methods of extruding bark according to this invention virtually eliminate the likelihood of explosions since they involve drying the bark to less than 7% moisture. Also, a thermoplastic binder is added to the bark so that the bark-thermoplastic mixture sufficiently adheres to the interior surface of the extruder barrel wall to allow the screw to pass the bark through the extruder. Further, temperature of the bark and the extruder are controlled so that the bark does not char or burn during the extrusion process. The thermoplastic binder for bark cooperates with natural resins therein and adequately binds the bark pieces together so that solid articles such as synthetic fuels which can be in the form of fireplace logs can readily be formed.

Although synthetic fuels are known and have been made in various forms including those for home use such as briquettes and fireplace logs, such articles, when made by conventional methods, have had most any combination of shortcomings. For example, such synthetic fireplace logs often are loosely packed, improperly bonded, flaky and dirty to the touch. They often are unnatural-looking since many have decorated paper wrappings and they can be too heavy for certain consumers. The logs also often are very sensitive to moisture, difficult to light, unpleasant odor-producing, and of low fuel value. Further, the materials used to make conventional synthetic fuels often have other useful purposes. For example, sawdust and wood chips often can be used for making paperboard or other wood-derived products such as particleboards.

It would therefore be desirable to provide a method of making articles such as synthetic fuels which overcome the aforementioned shortcomings.

The solid article, synthetic fuel or fireplace log made according to the method of this invention is well-bonded and solid, does not flake or come apart, has a smooth, hard finish and is clean to the touch. It has a natural wood-like appearance without the use of decorated wrappings, it weighs less than some presently commercial synthetic logs, and is only slightly moisture sensitive. The logs light easily, burn quietly and cleanly and have a higher fuel value than wood itself.

The bark, combustible thermoplastic and waxed paper waste materials used to make the solid synthetic fuel, or fireplace log of this invention often have no other apparent useful purpose, and are often considered of negative value. Most of the multi-million tons of such waste materials produced each year must be deposited at and/or burned at dump areas. The method of making the solid article, synthetic fuel or fireplace log of this invention is therefore economically and ecologically advantageous because it provides an important, valuable fuel use for the aforementioned waste materials.

Numerous other objects and advantages of the invention will be apparent as it is better understood from the following description, which, taken in connection with the accompanying drawing, discloses a preferred embodiment thereof.

BRIEF SUMMARY OF THE INVENTION

This invention is in a method of extruding bark into the form of a solid article which can be a solid synthetic fuel in the form of a fireplace log. The method comprises: physically blending pieces of combustible thermoplastic of an extrudable size with pieces of bark also of an extrudable size and having less than 7%, preferably less than 2% moisture to form a bark-thermoplastic mixture of from about 60 to 95% percent by weight bark and about 2.5 to 40% percent by weight thermoplastic, feeding the mixture to an extruder, heating the bark thermoplastic mixture in the extruder, controlling the heat of the mixture in the extruder so that its temperature is insufficient to char the bark pieces yet sufficient to melt the thermoplastic and disperse it between the bark pieces so that it acts as a binder therefore and adheres sufficiently to the interior barrel wall surface of the extruder to allow the bark binder mixture to be moved therethrough by the extruder screw, extruding the mixture in the form of a composite extrudate, and cooling the composite extrudate to solidify it into the solid article, synthetic fuel or fireplace log. Preferably, the extruder heat controlling step includes cooling the extruder screw tip to prevent charring of compressed bark pieces adjacent to the screw tip, controlling the heat of the extruder to range from about 200° to 400°F., controlling the respective extruder barrel zone temperatures by maintaining barrel zone 1 at from about 250° to 300°F. preferably about 275°F., barrel zones 2 and 3 from about 275° to 325°F., preferably about 300°F., the metering zone from about 250° to 300°F., preferably about 275°F., and the extruder gate from about 250° to 300°F., preferably liquid cooling it to about 255°F. Preferably the extruding step includes extruding the composite extrudate through a die and preferably the cooling step includes cooling the die preferably with liquid to from about 80° to 150°F. The die can be profiled to form the fireplace log. The pieces of thermoplastic can be pieces of combustible thermoplastic-treated fibrous material of an extrudable size and the thermoplastic dispersed during the heating step in such case is separated from the pieces of combustible thermoplastic-treated fibrous material. Preferably the blending step includes blending with the bark and thermoplastic pieces, pieces of extrudable size of from 0 to 20% by weight combustible wax-treated fibrous material, and in such case the heating step is at a temperature sufficient to also melt the wax of the wax-treated fibrous material and substantially separate the wax therefrom so that the separated wax is dispersed with the thermoplastic and acts as a bonder for the bark pieces, the separated wax comprising from 0 to about 7%, and the fibrous material from 0 to about 13% of the total weight of the article, fuel or log. Preferably, the bark is about 80% by weight and the percent combustible thermoplastic and percent wax-treated fibrous material are in a ratio of 1:1.

BRIEF DESCRIPTION OF THE DRAWING

FIG. 1 is a perspective of a portion of the solid synthetic fuel or fireplace log of this invention.

DETAILED DESCRIPTION OF THE INVENTION

FIG. 1 shows a solid article which can be a solid synthetic fuel in the preferred embodiment of a solid synthetic fireplace log, generally designated 10, comprising a composite 12 of from about 60 to 95% bark and a binder of from about 2.5 to 40% combustible thermoplastic dispersed in log 10, the percents being based on the total weight of the log. Composite 12, as shown, preferably also comprises pieces of one or more types of combustible cellulosic or fibrous materials 14, randomly dispersed in the log.

The bark employed in composite 12 can be of any single or combination of types of bark obtained from trees or like matter. Bark herein means the tough exterior coverings of wood trees, stems, roots or like matter as distinguished from underlying wood or wood residue materials such as wood chips, sawdust, etc. Examples of trees from which bark can be obtained are soft and hardwood trees including Aspen, Pine, Douglas Fir, Hemlock, etc. For reasons explained later, the bark must have a moisture content less than about 7%, preferably less than about 2%.

The binder component of composite 12 can be any suitable combustible thermoplastic or combination of thermoplastics which can be dispersed in log 10 or composite 12 to bind the bark into a composite solid. The thermoplastic preferably, for fireplace logs, is nonnoxious odor-producing, i.e. it must not produce fumes which would generally be considered harmful for home use of the log. Examples of suitable thermoplastic binders are polyethylenes of any density, polypropylenes, vinyl chlorides, and ionic copolymers of ethylene and ethylenically unsaturated carboxylic acids sold under the trademark "Surlyn" by I. E. DuPont de Nemours & Company. The preferred binder is polyethylene.

The thermoplastic can be employed per se in virgin or waste form, or it can be in the form of or part of combustible thermoplastic-treated fibrous materials or substantially separated from the fibrous portion thereof.

As will be explained, the thermoplastic component, no matter how employed, must be reduced to or employed in pieces of workable size. Suitable waste thermoplastics are films and laminates shredded or ground into what is commonly known as "fluff". Especially suitable is fluff from 0.001 inch polyethylene film. Suitable waste thermoplastic-treated fibrous materials are trim and other scrap of thermoplastic especially polyethylene-coated paper, paperboard and cardboard packages. Other suitable waste materials are what are known as poly-fiber rejects which contain high moisture and must be dried to the extent of the bark, but which are otherwise desirable because, being reclaim from polyethylene coated paperboard, they contain some fibers and greater than 70% polyethylene.

The bark-thermoplastic mixture and resulting composite 12 of article, fuel or log 10 preferably also comprise from about 0 to 20% combustible wax-treated fibrous material preferably waxed paper randomly dispersed therein. Preferably, as will be explained, the wax from the wax-treated fibrous material is substantially separated from the fibrous material by heat during the extrusion process and the wax is dispersed in the log and acts as a binder with the thermoplastic. When the wax is separated from the fibrous material, the wax can be from about 0 to 7% and the fibrous material from about 0 to 13% of the total weight of log 10. Usually, some of the fibrous material does not have all of its wax separated and removed therefrom.

The wax need not be employed as or obtained from wax-treated fibrous materials but like the thermoplastic can be employed per se in virgin or waste form.

As with the thermoplastic, the wax material no matter how employed must be employed in pieces of workable size. Suitable virgin or waste waxes are microcrystalline and paraffin waxes which melt below the temperatures at which fuel or log 10 is made. Suitable waste wax-treated fibrous materials are trim and scrap from wax-treated or coated paper, paperboard and cardboard packaging materials, for example waxed paper and wax-coated frozen food packages. The preferred wax material is waxed paper "broke" ground into small pieces.

Fibrous material 14, as can be seen from the above, can be any suitable cellulosic or fibrous material such as paper, paperboard, cardboard or like materials which are wholly or partly, or which once were treated with the previously mentioned thermoplastic and/or wax materials. "Treated" herein is meant to include "coated" and it is meant to include such materials when part of laminates.

The thermoplastic and/or wax materials present in log 10, whether employed per se, as separated from their respectively so treated fibrous materials or as part of the treated fibrous materials themselves, act as binders for the bark component. The binders are dispersed throughout composite 12, that is, in, around and adjacent the pieces of bark, to the extent that the materials are present in the composite. Desirably, they are as substantially continuously dispersed throughout log 10 as possible.

The amount of combustible thermoplastic employed in composite 12 can be from 2.5 to 40%, but preferably, it is about 10%, based on the total weight of log 10. Since the thermoplastic adheres to the extruder wall and facilitates movement of the bark-binder mixture through the extruder, it is desirable that at least 5% thermoplastic be employed in the mixture, although lower amounts thereof are suitable when wax is also present in the bark-binder mixture. Although the extrusion process becomes easier the greater the amount of thermoplastic employed, amounts over 40% increasingly render the burning characteristics of log 10 less like that of bark or wood and render the cost of the thermoplastic, even in the form of polyethylene scrap, increasingly prohibitively expensive.

The amount of wax employable in composite 12 is from 0 to about 10% when employed per se, and from 0 to about 20% based on the total weight of log 10 when employed as a combustible wax-treated fibrous material. When the wax is substantially separated from the fibrous material, the separated wax comprises from 0 to about 7% and the separated fibrous material comprises from 0 to about 13% of the total weight of log 10. The upper amounts of wax which can be employed are not rigid, for greater amounts of wax per se could be employed if log 10 were made by a compression molding technique, though increasing the above mentioned amounts increases the slickness of the bark-binder mixture, thereby reduces back pressure in an extruder and thereby makes it increasingly difficult to extrude the mixture into a log of suitable density.

Preferably, log 10 comprises about 80% bark and the combustible thermoplastic and wax-treated fibrous materials are in a 1:1 ratio, preferably about 10% combustible thermoplastic and about 10% combustible wax-treated fibrous material, the wax separated therefrom comprising about 3.5% and the fibrous material about 6.5% of the total weight of log 10.

Logs 10 can include additional materials such as copper chloride and lithium chloride salts to add color to flames produced by the logs during burning.

The density of log 10 can be from as low as 35 lbs/ft.$^3$, but more commonly is from about 60 to 85 lbs/ft.$^3$, preferably from about 71.8 to 78.2 lbs/ft.$^3$. The density of log 10 will vary depending on several factors including the composition of the log and the method employed in making it. Density increases for example with increased bark content. In extrusion processes, it increases with increased extruder screw and die compression ratios, and decreases with increased screw speeds.

Log 10 can be of any suitable shape and dimensions. Preferably, log 10 is about 16 inches long and is substantially triangular or pie-shaped, so that the arcuate base thereof cuts about a 60° sector of circle, the radius of the sides of the log being 3½ inches. Six such logs suitably stacked form a cylindrical log having about a 7 inch diameter.

The method of extruding bark according to this invention, into the form of a solid article comprising mostly bark, preferably into a solid synthetic fuel in the form of fireplace log 10, involves first preparing the respective component materials and combinations thereof which make up the bark-binder mixture which is extruded as composite 12. Bark is worked into usable, compressable, extrudable pieces by any suitable means, for example by hammermilling it through a screen of desirable size depending, for example on the size of the extruder. For a 4½ inch extruder, it has been found advantageous to use a 1 to 1½ inch screen, although smaller screen sizes can be employed. The combustible thermoplastic and thermoplastic and/or wax-treated fibrous materials can be shredded and ground to similar extrudable sizes, preferably to less than 1 inch shreds or pieces to induce their melting and dispersion in the bark.

The hammermilled bark pieces are dried from their usual high moisture content, e.g. about 50%, to less than about 7%, preferably less than 2% moisture. Such drying, especially to less than 2% moisture, is necessary to prevent steam from forming and causing explosions due to due to high temperatures employed during the extrusion process. Drying can be effected by any suitable conventional means such as an industrial rotary drum gas or oil fired drier. The bark can be dried at any suitable time though it is advantageous to dry it after it is worked to size.

When the bark is dried, appropriate respective combinations and amounts of the bark and other components are selected according to the particular combination and density of fireplace log desired.

The selected amounts and combination of components are then physically blended or mixed by any suitable means such as a continuous zig zag blender to form a bark-binder or bark-thermoplastic mixture having from about 60 to 95% by weight bark and about 2.5 to 40% by weight thermoplastic and/or any amounts or combinations of other materials previously disclosed herein. The resulting bark-binder mixture is fed to an extruder such as a standard plastic extruder and the mixture is heated therein. The heat of the extruder is controlled so that its temperature is insufficient to char the bark pieces yet sufficient to melt or plasticize the thermoplastic and/or wax binder components, substantially separate them from their respective fibrous materials, if any, and disperse the binders between the bark pieces of the mixture. The heat of the extruder is controlled to range from about 200° to 400°F. as will be explained in more detail later. Having a thermoplastic such as polyethylene in the mixture is essential for the extrusion process since it provides a plastic-like property to the bark and adheres sufficiently to interior surface of the extruder barrel wall to allow the extruder screw to move the bark-binder mixture through the extruder. Bark alone in the extruder would not so adhere but would tend to remain stuck in the screw and would not move forward in the extruder. Having a wax component is also important to the extrusion process since, upon the application of heat, the wax migrates to the surface of the mixture and reduces friction and back pressure in the extruder sufficiently to allow the log to slip through the die. Bark alone often causes much friction in the extruder and the die and sometimes does not adequately slip therethrough.

As previously stated, the heat of the extruder is controlled to operate at a temperature range of from about 200° to 400°F. The temperature of the respective extruder zones must be controlled, for example for a 4½ inch extruder Zone 1 is from about 200° to 300°F., preferably about 275°F., Zones 2 and 3 are from about 275° to about 325°F., preferably about 300°F., and Zone 4, the metering zone is cooled, preferably with liquid to from about 250° to 300°F. The metering zone must be so cooled because of the considerable amount of compressional and frictional heat built up by the bark-binder mixture being there compressed prior to its exit from the extruder. The extruder gate temperature for the aforementioned extruder is controlled to be from about 250° to about 300°F., preferably about 255°F. It is to be noted here that when the extruder is operated, especially at the higher end of the previously mentioned temperature ranges, the bark component preferably has less than 2% moisture to prevent explosions. It is also to be noted that although the temperature of the entire extruder screw employed in the extruder is not controlled i.e. cooled since cooling promotes adhesion rather than slippage of the bark-binder mixture to the screw, the extruder screw tip must be sufficiently cooled, most desirably with water, since compression of bark pieces adjacent to the tip creates such frictional heat that such cooling is necessary to prevent charring and burning of the bark component of the bark-binder mixture.

The bark-binder mixture is extruded in the form of a composite extrudate which is cooled to solidify it into the solid article, solid synthetic fuel, or fireplace log 10. Preferably, the composite extrudate is extruded through a die, preferably cooled to from about 80° to 150°F. Also preferably, the die is profiled to form, and the solid article or solid synthetic fuel is formed as a solid synthetic fireplace log desirably having the triangular shape of log 10. Once the solid article, fuel or log is cooled, preferably with a suitable liquid, and solidified to for example about 150°F., the formed log is removed from the cooling die.

Extruders which can be employed for forming fireplace log 10 according to this invention can be of any suitable size although commonly they probably would not be smaller than a 3½ inch extruder nor larger than about an 8-inch extruder. For forming logs having the preferred densities and dimensions of this invention, a 4½ inch extruder is preferred. The type of extruder can be of any standard type such as a Prodex extruder. The extruder must have drive means of sufficient power to handle potentially large amounts of back pressure e.g. up to about 7–8000 psi. The extruder should be of the non-vented types since bark tends to plug up and extrude out of any vents appearing therein. Although conventional extruder screws can be employed, improved feeding and extruding are obtained when the general pitch of the screw is shortened, for example to about 3¼ inch for a 4½ inch diameter screw. Such a screw preferably is of a single stage, has a length to diameter ratio of about 24:1 and a compression ratio of 2:1 with a ½ inch channel depth in the metering section.

Dies which can be employed for forming log 10 preferably are of special design to reduce friction and facilitate cooling. The inside surface of the dies should for example be polished and chrome plated to obtain a smooth surface with minimum frictional potential. The entirety of the die must be cooled to from about 80° to 150°F. preferably to about 100°F. If the die is liquid cooled with for example water or glycol, it must be sealed throughout to prevent leakage through the die to the logs, since steam forming in the log might result in violent explosions. It has been found advantageous in forming the log of this invention to employ a die having a 4½ inch diameter adjacent the extruder gate, and which gradually changes shape through a transition zone into a straight-length triangular shape for forming logs having the preferred dimensions.

Although extruder operating conditions can vary somewhat, for example according to the extruder used, the size log manufactured, and the composition of composite 12, etc., the extrusion screw speed can be any suitable speed ranging from about 1 to 200 rpm. For example, for a 4½ inch extruder screw speed can be from about 14 to 16 rpm. The speed at which log 10 is produced is according to machine and cooling system capabilities for cooling and solidifying composite 12 into logs of a given diameter. Back pressure should be sufficient to obtain the desired densities which can range from about 35 to 85 lbs/ft.³.

The method of forming a solid article, solid synthetic fuel or fireplace log 10 according to this invention was used to manufacture 65 logs, each comprising about 80% by weight bark, 10% by weight polyethylene and about 10% by weight waxed paper. The bark was Aspen, hammermilled through a 1 to 1½ inch screen, the polyethylene was scrap from 0.001 inch polyethylene film ground into "fluff" through a ¼ to ½ inch screen, and the waxed paper was ground to shreds comparable to being hammermilled through a 1 to 1½ inch screen. The bark was dried to less than 2% moisture and the three components were physically blended and fed to a 4½ inch Prodex extruder powered by a 150 horsepower motor, having a specialized single stage, 4½ inch screw having a 3¼ inch pitch, a 24:1 length to diameter ratio, a compression ratio of 2 to 1 and a ½ inch depth channel in the extruder metering or compression zone. The extruder was run at a screw speed of about 14 to 16 rpm., and the barrel Zones of the extruder were maintained at the previously mentioned preferred temperatures for a 4½ inch extruder. Back pressure during the run was from 750 to 2000 psi and the average rate of extrusion was 7.3 inches per minute. The extruded ribbon was passed through the extruder gate to a 4½ inch diameter profile die cooled to about 100°F. and having a transition zone which profiled the extruder composite from its cylindrical extruder barrel shape to a straight-length triangular fireplace log shape having previously mentioned preferred dimensions.

The average weight of the resulting fireplace logs was 4.7 pounds and their average density was 73.6 lbs/ft³. Three of the 65 logs produced were burned and produced a clean flame for 2 hours and 20 minutes, from ignition to flame die out. The ash remaining from the fire was 6% of the total original log weight.

A plurality of logs of smaller size were made by basically the aforementioned extrusion method except that when the selected materials were blended they were fed and passed through the extruder while the bark component was in its wet, i.e. undried, state to drive off the excess moisture. The extruder did not have a die attached thereto. The scrap extrudate ribbon was then reduced to an extrudable size, as it was in the process for the 4½ inch extruder, and the resulting mixture was passed through the 1 inch extruder and a die to form logs having an average diameter of from about 0.425 to 1 inch. The 1 inch extruder had a 1 inch screw with a ¾ inch pitch, a length to diameter ratio of 21:1, a compression ratio of 1.89:1, and a metering zone channel depth of 0.100 inch. Screw speeds for the run ranged from about 24 to 102 rpm though the average speed was about 70 rpm. The extrusion rate was as slow as ½ to 1 inch/minute, but the average rate was about 6–7 inches/minute. Amounts of respective components of the logs and extrusion conditions of the run are given in TABLE I.

TABLE I

| Run No. | % Aspen | % P.E. | % W.P. | % P.F.R. | BZNo. 1 (T) | BZNo. 2 (T) | No. Temperature (°F) Transition Zone (Die Adapter)(T) | Cooling Die (T) | Back Pressure (psi) | Density (lbs/ft³) |
|---|---|---|---|---|---|---|---|---|---|---|
| 1 | 95 | 5 | — | — | 250 | 265 | 300 | ambient | 3,500–4,000 | 83.5 |
| 2 | 80 | — | 10 | 10 | " | " | " | 150 | NR | 83.7 |
| 3 | 80 | — | 20 | — | 200 | 225 | 250 | 120 | NR | NR |
| 4 | 80 | — | — | 20 | 250 | 300 | 300 | 125 | NR | 74.7 |
| 5 | 80 | 10 | — | 10 | 350 | 350 | 350 | 175 | NR | 35.0 |
| 6 | 60 | 20 | 20 | — | 250 | 265 | 300 | 125 | 400– | 77.0 |

TABLE I-continued

| Run No. | % Aspen | % P.E. | % W.P. | % P.F.R. | BZ No. 1 (T) | BZ No. 2 (T) | Temperature (°F) No. Transition Zone (Die Adapter)(T) | Cooling Die (T) | Back Pressure (psi) | Density (lbs/ft³) |
|---|---|---|---|---|---|---|---|---|---|---|
| 7 | 60* | 40 | — | — | 290 | 280 | 300 | none | 800 NR | 63.2 |

P.E. - Polyethylene "fluff"
* - Pine Bark
W.P. - Waxed Paper "broke"
P.F.R. - Poly-Fiber Reject
B.Z. - Barrel Zone of Extruder
NR - Not Recorded
T - Temperature (°F.)

Although it has been stated herein that the thermoplastic and/or wax components either when provided per se or as separated from their fibrous materials, are the bonding agents which bind the bark pieces together to form composite 12, it is understood that natural resins in the bark cooperate with the termoplastic and wax components in binding the bark pieces together.

Also, although this invention has been described as a fuel or fireplace log it is understood that this covers any product or article comprising the combination of components of this invention. The solid fuels, fireplace logs or other so comprised articles can be decorated in their heated, cooled or natural states. For example dies can be adapted to give wood, bark, or other textures and designs to the logs formed therein.

It is thought that the invention and many of its attendant advantages will be understood from the foregoing description and it will be apparent that various changes may be made in the steps of the methods described and their order of accomplishment without departing from the spirit and scope of the invention or sacrificing all of its material advantages, the methods hereinbefore described being merely preferred embodiments thereof.

We claim:

1. A method of forming a solid synthetic fuel comprised of from about 60 to 95% by weight bark, the method which comprises:
   drying pieces of bark of an extrudable size to a moisture content of less than 7%,
   physically blending pieces of combustible non-noxious non-odor-producing thermoplastic of an extrudable size with said dried pieces of bark to form a bark-thermoplastic mixture of from about 60 to 95% by weight bark and about 5 to 40% by weight thermoplastic,
   feeding the mixture to an extruder,
   heating the bark thermoplastic mixture in the extruder,
   controlling the heat of the extruder to range from about 250°–400°F so that its temperature is insufficient to char the bark pieces yet sufficient to melt the thermoplastic and disperse it between the bark pieces so that it acts as a binder therefor and adheres sufficiently to the interior barrel wall surface of the extruder to allow the mixture to be moved therethrough by the extruder screw,
   extruding the mixture in the form of a composite extrudate, and
   cooling the composite extrudate to solidify it into the solid synthetic fuel.

2. The method of claim 1 wherein the extruder heat controlling step includes cooling the extruder screw tip to prevent charring of compressed bark pieces adjacent to the screw tip.

3. The method of claim 2 wherein the extruder heat controlling step includes controlling respective extruder barrel zone temperatures by maintaining barrel zone (1) at from about 250° to 300° F, barrel zones (2 and 3) from about 275° to 325° F, the metering zone from about 250° to 300° F, and the extruder gate from about 250° to 300° F.

4. The method of claim 3 wherein the bark pieces are dried to less than 2% moisture, the combustible thermoplastic is polyethylene, and barrel zone (1) is maintained at about 275° F, barrel zones (2 and 3) at about 300° F, the metering zone at about 275° F, and the extruder gate is liquid cooled to about 255° F.

5. The method of claim 1 wherein the extruding step includes extruding the composite extrudate through a die.

6. The method of claim 5 wherein the heat controlling step includes controlling the respective extruder barrel zone temperatures by maintaining barrel zone (1) at from about 250° to 300° F, barrel zones (2 and 3) from about 275° to 325° F, the metering zone from about 250° to 300° F, and the extruder gate from about 250° to 300° F, and wherein the cooling step includes cooling the die to from about 80° to 150° F.

7. The method of claim 6 wherein the die is profiled to form, and the solid synthetic fuel is formed as, a solid synthetic fireplace log.

8. The method of claim 4 wherein the cooling step includes cooling the die to from about 80° to 150° F.

9. The method of claim 1 wherein the extruding step includes extruding the composite extrudate through a die profiled to form, and the solid synthetic fuel is formed as, a solid synthetic fireplace log.

10. The method of claim 2 wherein the extruding step includes extruding the composite extrudate through a die profiled to form, and the solid synthetic fuel is formed as, a solid synthetic fireplace log.

11. The method of claim 3 wherein the extruding step includes extruding the composite extrudate through a die profiled to form, and the solid synthetic fuel is formed as, a solid synthetic fireplace log.

12. The method of claim 4 wherein the die is profiled to form, and the solid synthetic fuel is formed as, a solid synthetic fireplace log.

13. The method of claim 1 wherein the pieces of combustible thermoplastic are pieces of combustible thermoplastic-treated fibrous material of an extrudable size, and the thermoplastic dispersed during the heating step is separated from the pieces of combustible thermoplastic-treated fibrous material.

14. The method of claim 3 wherein the pieces of combustible thermoplastic are pieces of combustible thermoplastic-treated fibrous material of an extrudable size, and the thermoplastic dispersed during the heating step is separated from the pieces of combustible thermoplastic-treated fibrous material.

15. The method of claim 8 wherein the pieces of combustible thermoplastic are pieces of combustible thermoplastic-treated fibrous material of an extrudable size, and the thermoplastic dispersed during the heating step is separated from the pieces of combustible thermoplastic-treated fibrous material.

16. The method of claim 1 wherein the blending step includes blending with the bark pieces and thermoplastic pieces, pieces of extrudable size of from 0 to 20% by weight combustible wax-treated fibrous material, and the heating step is at a temperature sufficient to also melt the wax of the wax-treated fibrous material and substantially separate the wax therefrom so that the separated wax is dispersed with the thermoplastic and acts as a binder for the bark pieces, the separated wax comprising from 0 to about 7%, and the fibrous material from 0 to about 13%, of the total weight of the fuel.

17. The method of claim 16 wherein the bark pieces contain less than 2% moisture, the bark is about 80% by weight, and the percent combustible thermoplastic and percent wax-treated fibrous material are in a ratio of 1:1, the percents being based on the total weight of the fuel.

18. The method of claim 17 wherein the extruder heat controlling step includes cooling the extruder screw tip to prevent charring of compressed bark pieces in the extruder metering zone adjacent the screw tip, and includes controlling the respective barrel zone temperatures by maintaining barrel zone (1) at from about 250° to 300° F, barrel zones (2 and 3) from about 275° to 325° F, the metering zone from about 250° to 300° F, and the extruder gate from about 250° to 300° F.

19. The method of claim 18 wherein the extruding step includes extruding the composite extrudate through a die, and the cooling step includes cooling the die to from about 80° to 150° F.

20. The method of claim 19 wherein the die is profiled to form, and the solid synthetic fuel is formed as, a solid synthetic fireplace log.

21. The method of claim 16 wherein the pieces of combustible thermoplastic are pieces of combustible thermoplastic-treated fibrous material of an extrudable size, and the thermoplastic dispersed during the heating step is separated from the pieces of combustible thermoplastic-treated fibrous material.

22. The method of claim 17 wherein the pieces of combustible thermoplastic are pieces of combustible thermoplastic-treated fibrous material of an extrudable size, and the thermoplastic dispersed during the heating step is separated from the pieces of combustible thermoplastic-treated fibrous material.

23. The method of claim 18 wherein the pieces of combustible thermoplastic are pieces of combustible thermoplastic-treated fibrous material of an extrudable size, and the thermoplastic dispersed during the heating step is separated from the pieces of combustible thermoplastic-treated fibrous material.

24. The method of claim 19 wherein the pieces of combustible thermoplastic are pieces of combustible thermoplastic-treated fibrous material of an extrudable size, and the thermoplastic dispersed during the heating step is separated from the pieces of combustible thermoplastic treated fibrous material.

25. The method of claim 20 wherein the pieces of combustible thermoplastic are pieces of combustible thermoplastic-treated fibrous material of an extrudable size, and the thermoplastic dispersed during the heating step is separated from the pieces of combustible thermoplastic-treated fibrous material.

26. A method of extruding bark into the form of a solid article, which comprises:
drying pieces of bark of an extrudable size to a moisture content of less than 7%,
physically blending pieces of combustible non-noxious non-odor-producing thermoplastic of an extrudable size with said dried pieces of bark to form a bark-thermoplastic mixture of from about 60 to 95% by weight bark and about 10 to 40% by weight thermoplastic,
feeding the mixture to an extruder,
heating the bark-thermoplastic mixture in the extruder,
controlling the heat of the extruder to range from about 250° to 325°F so that the temperature does not char the bark pieces yet melts the thermoplastic and disperses it between the bark pieces so that it binds the bark and adheres it to the interior barrel wall surface of the extruder to allow the mixture to be extruded therethrough,
extruding the mixture in the form of a composite extrudate,
and cooling the composite extrudate to solidify it into the solid article.

27. The method of claim 26 wherein the extruder heating step includes cooling the extruder screw tip to prevent charring of compressed bark pieces adjacent to the screw tip.

28. The method of claim 27 wherein the extruder heating step includes controlling the respective extruder barrel zone temperatures by maintaining barrel zone (1) at from about 250° to 300°F., barrel zones (2 and 3) from about 275° to 325°F., the metering zone from about 250° to 300°F., and the extruder gate from about 250° to 300°F.

29. The method of claim 28 wherein the bark pieces have less than 2% moisture, the combustible thermoplastic is polyethylene, and barrel zone (1) is maintained at about 275°F., barrel zones (2 and 3) at about 300°F., the metering zone at about 275°F., and the extruder gate is liquid cooled to about 255°F.

30. The method of claim 29 wherein the extruding step includes extruding the composite extrudate through a die to form the article and wherein the cooling step includes cooling the die to from about 80° to 150°F.

31. The method of claim 26 wherein the pieces of combustible thermoplastic are pieces of combustible thermoplastic-treated fibrous material of an extrudable size, and the thermoplastic dispersed during the heating step is separated from the pieces of combustible thermoplastic-treated fibrous material.

32. The method of claim 28 wherein the pieces of combustible thermoplastic are pieces of combustible thermoplastic-treated fibrous material of an extrudable size, and the thermoplastic dispersed during the heating step is separated from the pieces of combustible thermoplastic-treated fibrous material.

33. The method of claim 29 wherein the pieces of combustible thermoplastic are pieces of combustible thermoplastic-treated fibrous material of an extrudable size, and the thermoplastic dispersed during the heating step is separated from the pieces of combustible thermoplastic-treated fibrous material.

34. The method of claim 26 wherein the blending step includes blending with the bark pieces and thermoplastic pieces, pieces of extrudable size of from 0 to 20% by weight combustible wax-treated fibrous material, and the heating step is at a temperature sufficient to also melt the wax of the wax-treated fibrous material, and substantially separate the wax therefrom so that the separated wax is dispersed with the thermoplastic and acts as a binder for the bark pieces, the separated wax comprising from 0 to about 7%, and the fibrous material from 0 to about 13% of the total weight of the article.

35. The method of claim 34 wherein the bark pieces contain less than 2% moisture, the bark is about 80% by weight, and the percent combustible thermoplastic and percent wax-treated fibrous material are in a ratio of 1:1, the percents being based on the total weight of the article.

36. The method of claim 15 wherein the extruder heat controlling step includes cooling the extruder screw tip to prevent charring of compressed bark pieces in the extruder metering zone adjacent the screw tip, and includes controlling the respective extruder barrel zone temperatures by maintaining barrel zone (1) at from about 250° to 300°F. barrel zones (2 and 3) from about 275° to 325°F., the metering zone from about 250° to 300°F., and the extruder gate from about 250° to 300°F.

37. The method of claim 36 wherein the extruding step includes extruding the composite extrudate through a die, and the cooling step includes cooling the die to from about 80° to 150°F.

38. The method of claim 34 wherein the pieces of combustible thermoplastic are pieces of combustible thermoplastic-treated fibrous material of an extrudable size, and the thermoplastic dispersed during the heating step is separated from the pieces of combustible thermoplastic-treated fibrous material.

39. The method of claim 36 wherein the bark pieces contain less than 2% moisture, the bark is about 80% by weight, the percent combustible thermoplastic and percent wax-treated fibrous material are in a ratio of 1:1, the percents being based on the total weight of the article, and wherein the extruder heat controlling step includes cooling the extruder screw tip to prevent charring of compressed bark pieces adjacent to the screw tip, and includes controlling the respective extruder barrel zone temperatures by maintaining barrel zone one at from about 250° to 300°F., barrel zones (2 and 3) from about 275° to 325°F., the metering zone from about 250° to 300°F., and the extruder gate from about 250° to 300°F.

40. The method of claim 39 wherein the pieces of combustible thermoplastic are pieces of combustible thermoplastic-treated fibrous material of an extrudable size, and the thermoplastic dispersed during the heating step is separated from the pieces of combustible thermoplastic-treated fibrous material.

* * * * *